United States Patent [19]

Horton et al.

[11] 4,223,206

[45] Sep. 16, 1980

[54] METHOD AND APPARATUS FOR ELECTRICALLY HEATING CORROSIVE VAPORS

[75] Inventors: Anthony Horton, Welwyn Garden City; Thomas M. McKeon, Warrington; Jack Preston, Sheffield, all of England

[73] Assignee: Laporte Industries Limited, London, England

[21] Appl. No.: 872,050

[22] Filed: Jan. 25, 1978

[30] Foreign Application Priority Data

Jan. 26, 1977 [GB] United Kingdom ............... 03176/77

[51] Int. Cl.² .......................... F24H 3/04; H05B 3/02
[52] U.S. Cl. ....................................... 219/374; 13/25; 174/15 BH; 219/307; 219/368; 219/376; 219/381; 219/541; 338/316; 339/115 R; 422/199
[58] Field of Search ................................. 219/306–307, 219/368, 374, 375–376, 379–382, 316, 319, 300, 541; 338/55–56, 316; 13/20, 25; 339/112 L, 114, 115 R, 116 R; 174/15 BH; 422/173, 174, 198, 199

[56] References Cited

U.S. PATENT DOCUMENTS

| 1,858,483 | 5/1932 | Conrad | 338/316 |
| 1,925,784 | 9/1933 | Williams | 219/307 X |
| 2,397,445 | 3/1946 | Stupakoff | 174/15 BH |
| 2,619,579 | 11/1952 | Cartinhour | 219/374 |
| 2,670,426 | 2/1954 | Stone | 13/20 |

OTHER PUBLICATIONS

Piper, John D., "Liquid Dielectrics," *Dielectric Materials and Applications*, Arthur R. Von Hippel, Ed., Technology Press of M.I.T. and John Wiley & Sons, Inc., New York, 1954, pp. 156–157.

*Primary Examiner*—A. Bartis
*Attorney, Agent, or Firm*—Kane, Dalsimer, Kane, Sullivan and Kurucz

[57] ABSTRACT

A heating device for heating corrosive vapours includes a casing defining a vapour flow path having an inlet and an outlet. A tubular metallic electric resistance heating element is disposed in the flow path and arranged such that the vapours being heated successively pass in opposite directions along the interior and exterior of the element in flowing from the inlet to the outlet of the casing. To accomodate thermal expansion and contraction, one end of the element is connected to the casing by means of a flexible coupling there being provision to maintain at least a part of the flexible coupling immersed in a body of an electrically non-conductive liquid capable of shielding the coupling from the corrosive vapours during operation of the device. The non-conductive liquid may be maintained in the liquid state by circulation through a heat exchanger. The heating element may be made, for example, of platinum or a platinum alloy and the flexible coupling, for example, of a braid of such a metal or alloy or of tantalum. Preferably the apparatus is used to preheat titanium tetrachloride vapour for use in the manufacture of titanium dioxide by oxidation thereof. Where titanium tetrachloride vapour is to be heated the non-conductive liquid used is preferably titanium tetrachloride liquid.

23 Claims, 2 Drawing Figures

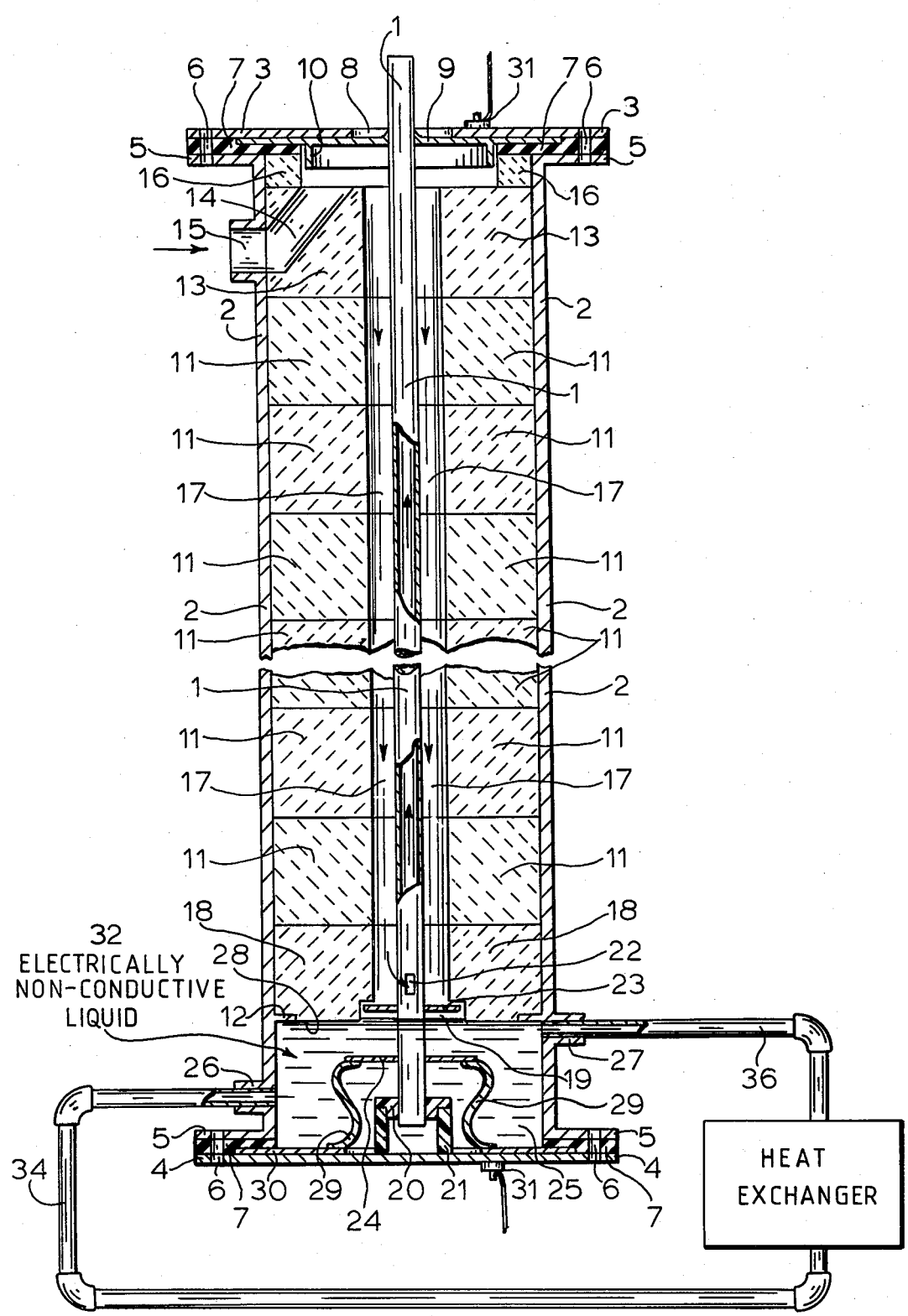

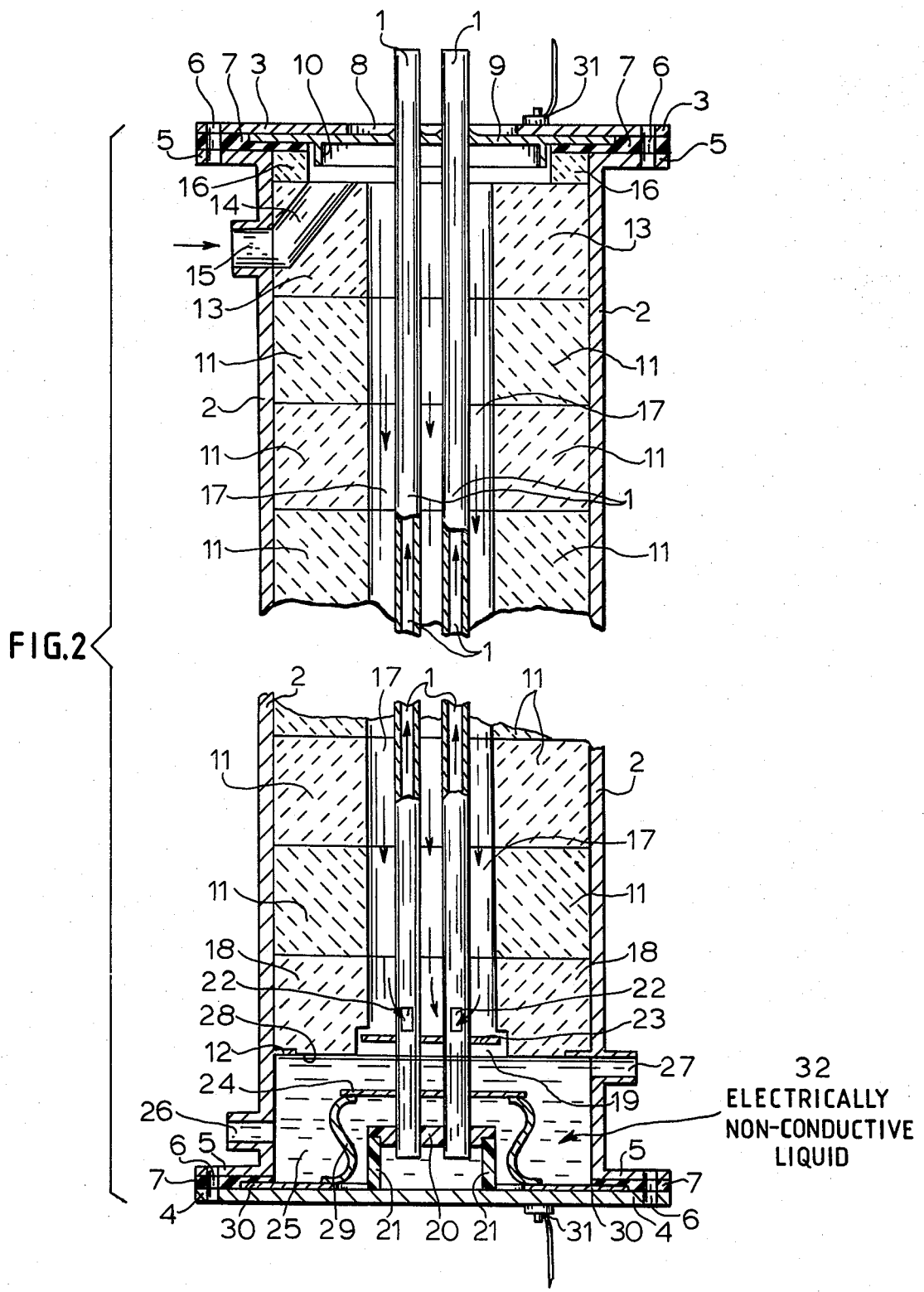

METHOD AND APPARATUS FOR ELECTRICALLY HEATING CORROSIVE VAPORS

BACKGROUND OF THE INVENTION

Field of the Invention

This invention relates to a vapour heating apparatus and process for heating corrosive vapour.

Brief Description of the Prior Art

Titanium dioxide may be manufactured by a process in which preheated titanium tetrachloride vapour and an oxidising gas are reacted in a gas stream in which the particles of titanium dioxide resulting from the reaction become entrained and are removed from the oxidation zone. One such process is described in British Pat. No. 1049282. In the process described in that patent the titanium tetrachloride vapour and the oxidising gas are each preheated to such a degree that, were they to be mixed without reaction taking place, the temperature of the mixture would be at least 700° C. and preferably would be within the range 950° C. to 1050° C. Titanium tetrachloride is extremely corrosive at elevated temperature, particularly at temperatures above 500° C. British Pat. No. 1049282 describes the use of a preheater constructed of silica tubing so as to withstand the corrosive effect of titanium tetrachloride vapour.

Because of the brittle nature of silica, vapour heaters constructed of metal have been developed. In some such heaters the vapour to be heated is passed in thermal contact with a metal electrical resistance heating element. However where a corrosive vapour, such as titanium tetrachloride vapour, is to be heated the expedient of constructing the heating element from metals having particular resistance to corrosion such as tantalum or platinum, or alloys of platinum with rhodium, ruthenium, palladium, gold, tungsten, nickel, cobalt or iridium or with mixtures of these metals, has been suggested in order to improve the resistance of the apparatus to the corrosive effect of the titanium tetrachloride vapour.

There is great difficulty, in practice, in heating apparatus comprising a metal electrical resistance element, in forming a reliable electrical connection between a portion of the heating element which is not fixed, with reference to the apparatus as a whole, due to the considerable magnitude of the thermal expansion and contraction of the heating element in operation. Heating elements of this kind can be up to, or even over, ten feet in length and when heated up to a temperature which may exceed 1000° C. are subject to a considerable amount of movement of certain parts thereof. This movement may be accommodated in a design of apparatus in which the electrical connection may be made out of contact with the vapour to be heated and, possibly, to a portion of the heating element which is at a lower temperature than the required operating temperature. A considerable simplification in design may be achieved, with resulting economies, if the electrical connection is made to a portion of the heating element which is, in the absence of special precautions the subject of this invention, partially or wholly exposed to contact with the vapour which is being heated and also subject to movement due to thermal expansion or contraction of the heating element. Such an electrical connection is subject to constructional difficulties. A sufficiently flexible electrical coupling to cope with the movement of the heating element, for example one made of an electrically conductive braid or wire, will under the conditions prevailing in the present apparatus, suffer severe structural deterioration in use due to the corrosion resulting from exposure to a corrosive vapour being heated. If the electrical coupling is made of more robust material its flexural properties will suffer correspondingly and the coupling may be subject to structural deterioration due to an inability to cope with the movement of the heating element in the course of use of the apparatus.

SUMMARY OF THE INVENTION

According to one aspect thereof, the present invention provides apparatus for heating corrosive vapour comprising a casing, a metal electrical resistance heating element in the casing, of which element one or more portions are fixed relative to the casing and one or more other portions are moveable relative to the casing under the influence of thermal expansion or contraction, inlet means for passing vapour to be heated into the casing and into contact with the element, outlet means for passing heated vapour from the casing, electrical connection means between a moveable portion of the element and the casing, said means comprising one or more flexible electrical couplings, and liquid immersion means so arranged that at least a part of the flexible couplings may be maintained immersed in a body of an electrically non-conductive liquid during use of the apparatus.

It may be advantageous to manufacture titanium dioxide by conducting the reaction between titanium tetrachloride vapour and an oxidising gas under positive pressure conditions. This is taught in British Pat. No. 1087697. The particular pressures taught are from 20 to 50 lbs per square inch above atmospheric pressure (psig). To achieve this the flow of oxidising gas and of titanium tetrachloride vapour supplied to the reactor must be at a still higher pressure than that prevailing within the reactor if the flow is to be maintained. The pressurisation of the titanium tetrachloride vapour for use in a reaction such as that disclosed in British Pat. No. 1087697 is preferably conducted before the titanium tetrachloride vapour is preheated rather than afterwards. In fact if the titanium tetrachloride vapour to be preheated is only partially pressurised the remainder of the pressure may be developed as a result of further expansion of the vapour during preheating.

One way of preheating titanium tetrachloride vapour is to pass the vapour to be heated under pressure through a metal electrical resistance heating element in the form of a tube with or without internal fins. Under these conditions however, even when the heating element is made from a corrosive resistant metal such as one of those listed above, the material of the heating element tends to pit with the formation of small holes through which the titanium tetrachloride vapour may escape under the influence of pressure. This effect could be avoided or reduced by utilising a heating element made from material of relatively thick section but this may involve a considerable cost penalty since some of the corrosion resistant metals are extremely costly and would also, very importantly, involve a lowering of the resistivity of the heating element.

We have now found that we can avoid or minimise certain problems associated with tubular metal electrical resistance heating elements, particularly when used to heat corrosive vapours under pressure, by making a remarkably simple modification to known practice.

This modification comprises passing the vapour to be heated successively into thermal contact with the exterior and the interior of the tubular metal electrical resistance heating element. The word "successively" is used to imply no order of succession and the vapour may therefore be passed firstly through the interior of the element and then along the exterior of the element or in the contrary direction. If the tubular heating element becomes pitted in use and develops small holes this may make little or no difference to the operation of the heater, the pressure difference between the exterior and interior of the tubular preheater being very small. Such an element therefore lends itself to use under conditions of positive pressure. An important further feature of this modification is that the residence time of vapour in contact with the tubular heating element is approximately doubled, thus making it possible to reduce the temperature of the heating element somewhat.

According to a further and preferred aspect of the present invention, therefore, the metal electrical resistance heating element is of tubular form, there is provided means to maintain a vapour to be heated in thermal contact with the exterior of the said element comprising a conduit externally spaced with respect to the said heating element and coaxial therewith and there is also provided means to pass the vapour to be heated successively in opposite directions through the space between the conduit and the heating element and through the interior of the heating element.

Preferably the conduit comprises a refractory material not subject to corrosion by the vapour and, particularly preferably is constructed of stacked refractory blocks suitably shaped to form the conduit for example stacked annular sections of alumina. Preferably the conduit and the element are contained within a casing adapted for operation under internal positive pressure conditions. Preferably said casing comprises a cylindrical side wall and upper and bottom closures fixed thereto. Preferably the element is fixed at or near one end thereof to the casing, suitably to the top closure thereof, and subtends therefrom, the other end of the element being moveable relative to the casing. The apparatus is suitably provided with one or more inlets/outlets communicating with the space between the conduit and the heating element and communicating with the interior of the heating element whereby the vapour to be heated may be introduced into and withdrawn from the apparatus. Very suitably one of the said conduits comprises an extension of the tubular heating element through the casing, suitably through the top closure thereof. Means comprising one or more apertures which may be either holes or slots, at a suitable position in the heating element may be provided to allow the passage of vapour to be heated between the interior of the element and the conduit. The lower end of the element is, suitably, closed.

This construction is particularly suitable for preheating corrosive vapours under pressure and is suitable for the use of a heating element constructed of very thin section material, particularly in the embodiment thereof in which the heating element subtends from a top closure in the casing of the apparatus thus minimising the requirement for the heating element to have structural strength. Preferably the immersion means comprises a bath defined by a lower portion of the casing into which the moveable end of the element protrudes from the conduit to below the normal liquid level therein when the element is at operating temperature.

To minimise contact in use between the corrosive vapour and the casing the refractory material forming the conduit suitably extends down to the liquid level. The one or more flexible couplings may be fixed at one end to the lower portion of the heating element or to a supporting member such as a disc or flange fixed thereto and at the other end to a conductive portion of the casing or to a conductor fixed to the casing. Preferably the flexible couplings are wholly below the normal liquid level, at operating temperature, in the bath. Preferably the flexible couplings are formed from metal wire braid and are suitably composed of platinum, a platinum alloy or tantalum. Preferably from 2 to 10 flexible couplings spaced radially with respect to the element are used.

Suitable means for the connection of the apparatus to an electrical supply are provided together with suitable earth connections.

The end of the heating element is immersed in the electrically non-conductive liquid, in use. The surface of the said liquid may be exposed to contact with heated vapour. The temperature of the liquid therefore will rise during operation of the apparatus and means to control this rise should preferably be provided.

One temperature control means which may be used is a heat shield positioned at or just above the surface of the liquid to reduce radiant and convective heating of the liquid in the immersion means during the operation of the apparatus. The heat shield may comprise hollow spheres of a suitable metal floating on the surface of the liquid, or may comprise a grid or plate of a suitable metal supported either on the element on the casing or on the stacked refractory sections comprising the conduit. A further temperature control means, which may be used in conjunction with a heat shield, is to provide means to remove liquid, either continuously or intermittently, from the immersion means and to feed cooler liquid into the immersion means to replace it. Suitably a heat exchanger is provided together with conduits for the recycling of the liquid from the immersion means to the heat exchanger and back to the immersion means after such purification as may be deemed necessary to preserve the required properties of the liquid, for example the electrical conduction properties. One method of controlling the level of impurities is to bleed a portion of the removed liquid and to replace it with fresh liquid.

In the course of a process using the apparatus provided by this invention and incorporating the above described heat control precautions it is possible to maintain the temperature of the liquid in the immersion means at below its boiling point subject to the selection of a liquid having a boiling point at a suitable level. Preferably the liquid in the immersion means has a boiling point above 100° C. so that it does not place too great a constraint on the operation of the temperature control means and not above 200° C. so that, in controlling the temperature of the liquid just below boiling point, the temperature will not be so high as to cause undue deterioration in the structure of the flexible couplings. The electrically non-conductive material to be present in the immersion means may be suitably selected from silicone fluids and halogenated compounds, for example from metal chlorides.

It would be desirable to utilise the liquid form of the vapour to be heated as the non-conductive liquid if possible. It so happens that titanium tetrachloride liquid fulfills all the physical and electrical requirements for use as the electrically non-conductive liquid in this invention. According to a particularly preferred feature of the invention therefore the corrosive vapour to be heated and the liquid present in the immersion means consists essentially of titanium tetrachloride. Partial evaporation of the titanium tetrachloride liquid and the escape of some of this vapour past the heat shield means can be tolerated within limits since no contamination of the vapour to be heated can result.

BRIEF DESCRIPTION OF THE DRAWING

The accompanying drawing of

FIG. 1 is a diagrammatic representation in vertical section of a vapour heating apparatus embodiment of the invention.

FIG. 2 is a diagrammatic representation like FIG. 1, but utilizing a plurality of heating elements.

The apparatus comprises a tubular electrical resistance heating element made of platinum or a suitable alloy of platinum supported coaxially within a cylindrical casing 2 made of a suitable corrosion resistant steel such as stainless steel or Inconel (Trade Mark).

The casing 2 carries upper and lower annular flanges 5 to which are attached upper and lower circular closure plates 3 and 4; which may also be made of stainless steel or Inconel; by means of bolts (not shown) passing through the aperture 6 in the flanges and in the closure plates. Electrical contact between the casing and the closure plates is prevented by the presence of the electrically insulating gaskets 7 which lie between them. The inner surfaces of the aperture 6 have a lining (not shown) of electrically insulating material. The upper closure plate 3 has a circular aperture 8 at its centre and surrounding the upward extension of the tubular electrical resistance heating element 1 and that heating element is supported in the casing by means of a circular plate 9 made of platinum or a suitable platinum alloy which is supported peripherally on the upper flange 5 and is attached at its centre to the heating element by being welded to it. The plate 9 is in electrical contact with the upper closure plate 3 but is electrically insulated from the casing 2 by means of the upper gasket 7. The plate 9 has an annular flange 10, projecting downwardly from it, having a suitable circumference to provide a heat shield for the inner surface of the upper gasket 7.

The interior of the casing 2 contains annular sections 11, 13, 18 of refractory ceramic material, suitably alumina, supported on the annular flange 12 on the casing. The upper section 13 of refractory ceramic material is formed to provide a channel 14, coincident with an entry port 15 in the casing, for the entry of vapour to be heated into the apparatus. Above the shaped section 13 here is an annular ring 16 also constructed of refractory ceramic material. An annular conduit 17 is formed between the interior surfaces of the ceramic sections and the heating element 1. The lower section 18 of refractory ceramic material is stepped to provide a short lower section 19 of the annular conduit having an increased diameter relative to the main portion 17.

The heating element 1 is supported, for sliding axial movement only, in a bush 20, which is suitably made of polytetrafluoroethylene whichh is mounted on a cylindrical member 21 attached to the lower closure plate. The heating element has a plurality (suitably from 2 to 4) of apertures 22 positioned to lie at the lower end of the main portion 17 of the annular conduit to provide access for vapour in the said portion of the conduit to the interior of the heating element. There are two circular discs, 23 and 24, made of platinum or of a suitable alloy of platinum, mounted on the heating element. The upper disc 23 is of a suitable diameter to lie with minimal radial clearance in the lower portion 19 of the annular conduit and is mounted at a suitable position on the heating element 1 to remain within the said portion 19 on expansion of the heating element in use. This disc 23 acts as a heat shield. The lower disc 24 lies in a chamber 25 formed by the absence of the refractory ceramic sections in the lower portion of the casing 2.

The portion of the apparatus defined by the casing at a level below the annular section 18 comprises immersion means capable of retaining, in use, a bath of liquid 32 and being provided with a lower inlet port 26 and an upper outlet port 27 for the liquid. Means, including conduits 34, 36 are provided between ports 26, 27 with an intermediately positioned heat exchanger, are provided to circulate the liquid 32 through the chamber 25 through the said ports. A suitable upper liquid level, at operating temperature, is indicated by numeral 28. The presence of liquid 32 in the chamber 25 would, in use, prevent vapour which by-passes the heat shield 23 from contacting the interior of the casing within the chamber 25.

The lower disc 24 mounted on the heating element 1 has mounted on it, in a radially spaced array, one end of 6 platinum braid flexible electrical couplings 29. There are conductor means 30 made of platinum or of a suitable alloy of platinum, suitably either comprising a number of bar conductors mounted on and radially spaced about the lower closure plate 4 to correspond to the mounting of the braid couplings on the disc 24, or comprising a single annular plate mounted on the lower closure plate. One end of each braid coupling is attached to the conductor 30 leaving some degree of slack in the couplings.

The apparatus is provided with electrical connectors 31 arranged for connection to a source of electrical supply at a suitable current and voltage level to cause the heating element 1, in use, to reach the desired operating temperature. The apparatus is also provided with suitable electrical earth connections.

In use, to heat titanium tetrachloride vapour, the vapour is passed into the apparatus through the port 15 and the channel 14 and flows in thermal contact with the heating element 1 along the conduit 17 as indicated in the drawing of FIG. 1 by the arrows. A bath of titanium tetrachloride liquid has been established in the chamber 25 and is circulated, while maintaining the liquid level 28, by means of ports 26 and 27 through a heat exchanger which cools the titanium tetrachloride liquid to below 100° C. The vapour in the channel 17 is forced by the presence of the liquid and by the heat shield 23 through the apertures 22 in the tubular heating element and flows up the interior of the heating element as indicated in FIG. 1 by the arrows, to issue from the apparatus into suitable piping connected to the upper end of the heating element 1. An electrical current is caused to flow between the connectors 31 through the heating element to attain the described operating temperature and heating the titanium tetrachloride vapour to at least 500° C.

The flow of the liquid through the chamber 25 is maintained at a velocity sufficient to prevent the liquid in the apparatus from boiling having regard to the performance of the heat exchanger. Any thermal expansion or contraction of the heating element 1 is accommodated by an axial movement of the element relative to the bush 20 and by flexure of the braids 29. If desired, to maintain the purity of the liquid in the chamber 25 at a level which is sufficiently low not to detract from the electrically insulating properties of the liquid, a portion of the liquid may be bled off and replaced by fresh liquid. The apparatus may be operated under a pressure of at least 20 lb/sq. inch by restricting the outflow of heated vapour from the apparatus.

In scaling up the apparatus depicted in the drawing to plant scale it may be necessary or desirable to modify the apparatus without departing from the essential features of the invention.

Normal engineering practice will demand some modifications one example of this being the practice of positioning a gasket against a cooled surface. It will also be necessary to jacket the apparatus externally to further minimise heat loss and to provide electrical insulation for live surfaces.

Other modifications may be desired from considerations of operating efficiency. For example a plurality (suitably from 2 to 6) of elements 1 may be grouped in spaced apart parallel arrangement within the conduit 17 as shown in FIG. 2. The apparatus of FIG. 2 is otherwise identical with that shown in FIG. 1 and the respective parts therein are identified by the same reference numeral applied to the same part in FIG. 1. The heated vapour from the resulting plurality of outlets may be passed to a single collecting chamber. Precautions to maintain the elements in their correct portions may include the utilisation of forces, resulting from the presence of the electrical current in the heating elements, attracting or repelling the elements relative to one another and the provision of refractory spacers and/or platinum or similar metal tie-wires. The tubular elements 1 may also be provided internally or externally with fins.

The refractory ceramic sections 11, 13 to 18 may be designed to reduce heat loss for example by being hollow and packed with a suitable heat insulating material such as refractory fibres.

Provision is maybe made for temperature measurement at a number of points along the conduit 17 and within the chamber 25 to assist in the control of the apparatus.

What we claim is:

1. Apparatus for heating corrosive vapour, which comprises;

a casing;

a hollow, tubular, metal electrical resistance heating element in the casing, of which element at least one portion is fixed relative to the casing and at least one other portion is movable relative to the casing under the influence of thermal expansion and contraction;

inlet means for passing vapour to be heated into the casing and into contact with the element;

means within said housing defining a vapour flow conduit externally spaced from and surrounding the element and coaxial therewith;

outlet means for passing heated vapour from the casing; said inlet, the conduit, the interior of said heating element and said outlet being so arranged and interconnected as to cause the corrosive vapour to successively pass in opposite directions along the exterior and the interior of the element in flowing through said casing from said inlet to said outlet; and electrical connection means on said casing and connected to the movable portion of the element for supplying electric power to said element, said electrical connection means comprising at least one flexible electrical coupling of sufficient flexibility to allow said element to move under the influence of thermal expansion and contraction, and liquid immersion means in said casing so arranged relative to said electrical connector means that at least a part of said at least one flexible coupling is maintained immersed in a body of an electrically non-conductive liquid capable of shielding said coupling from corrosive vapours during use of the apparatus.

2. Apparatus as claimed in claim 1 wherein the interior surface of the means defining the conduit comprises a refractory material.

3. Apparatus as claimed in claim 2 wherein the means defining the conduit comprises of stacked annular sections of alumina.

4. Apparatus as claimed in claim 1 wherein the element is fixed at or near one end thereof to the casing and subtends from the casing, the other end of the element being moveable relative to the casing.

5. Apparatus as claimed in claim 4 one of said inlet and outlet means wherein comprises an extension of the element through the casing.

6. Apparatus as claimed in claim 4 wherein the element has one or more apertures therein to allow the passage of vapour to be heated between the interior of the element and the conduit.

7. Apparatus as claimed in claim 4 wherein the immersion means comprises a bath defined by a lower portion of the casing into which the movable end of the element protrudes from the conduit to below the normal liquid level therein when the element is at operating temperature.

8. Apparatus as claimed in claim 7 comprising from 2 to 10 flexible couplings radially spaced around the element and positioned below the normal liquid level in the bath.

9. Apparatus as claimed in claim 4 comprising a heat shield positioned above the surface of said liquid so as to reduce radiant and convective heating of the liquid in the immersion means during operation of the apparatus.

10. Apparatus as claimed in claim 4 wherein the flexible couplings are formed from metal wire braid.

11. Apparatus as claimed in claim 10 wherein the flexible couplings are composed of platinum, platinum alloy or tantalum.

12. Apparatus as claimed in claim 4 comprising means to remove said non-conductive liquid from the immersion means and to feed said non-conductive liquid into the immersion means.

13. Apparatus as claimed in claim 12 comprising a heat exchanger together with conduits arranged for the continuous recycling of said non-conductive liquid from the immersion means through the heat exchanger and back to the immersion means.

14. Apparatus as claimed in claim 1 wherein the casing is adapted for operation under internal positive pressure conditions.

15. Apparatus as claimed in claim 1 wherein the element is composed of platinum or of a platinum alloy.

16. Apparatus as claimed in claim 1 wherein there is present a plurality of the elements in parallel spaced apart arrangement within the conduit.

17. Apparatus as claimed in claim 1 wherein the casing is composed of a corrosion resistant steel.

18. A process for heating a corrosive fluid, which comprises:
(a) providing apparatus which comprises,
   a casing;
   a hollow, tubular, metal electrical resistance heating element in the casing, of which element at least one portion is fixed relative to the casing and at least one other portion is movable relative to the casing under the influence of thermal expansion and contraction;
   inlet means for passing vapour to be heated into the casing and into contact with the element;
   means within said housing defining a vapour flow conduit externally spaced from and surrounding the element and coaxial therewith;
   outlet means for passing heated vapour from the casing; said inlet, the conduit, the interior of said heating element and said outlet being so arranged and interconnected as to cause the corrosive vapour to successively pass in opposite directions along the exterior and the interior of the element in flowing through said casing from said inlet to said outlet; and
   electrical connection means on said casing and connected to the movable portion of the element for supplying electrical power to said element, said electrical connection means comprising at least one flexible electrical coupling of sufficient flexibility to allow said element to move under the influence of thermal expansion and contraction, and liquid immersion means in said casing so arranged relative to said electrical connector means that at least a part of said at least one flexible coupling is maintained immersed in a body of an electrically non-conductive liquid capable of shielding said coupling from corrosive vapours during use of the apparatus;
   a source electrical energy connected to said electrical connection means, whereby the heating element may be energized;
(b) energizing the heating element from a source of electrical energy connected to said electrical connection means; and
(c) passing the fluid through the inlet means whereby it flows successively in opposite directions along said conduit and in thermal contact with the energized heating element and along the interior of the heating element, and then passes as a heated fluid through the outlet means.

19. A process as claimed in claim 18 wherein the electrically non-conductive liquid in the immersion means is selected from the group consisting of silicone fluids and halogenated compounds.

20. A process as claimed in claim 19 wherein the liquid comprises a suitably selected metal chloride.

21. A process as claimed in claim 18 wherein the immersion means includes a body of electrically non-conductive liquid having a boiling point of from 100° C. to 200° C.

22. A process as claimed in claim 18 wherein the corrosive vapour to be heated and the liquid present in the immersion means both consist essentially of titanium tetrachloride.

23. A process as claimed in claim 18 wherein the vapour is heated to at least 500° C.

* * * * *